（12） United States Patent
Östergård et al.

(10) Patent No.: US 6,803,903 B1
(45) Date of Patent: Oct. 12, 2004

(54) INTEGRATION OF ORGANIC LIGHT-EMITTING COMPONENTS INTO THE KEYBOARD OF AN ELECTRONIC DEVICE

(75) Inventors: Toni Östergård, Turku (FI); Terho Kaikuranta, Piispranristi (FI); Bror Svarfvar, Kaarina (FI)

(73) Assignee: Nokia Mobile Phones, Ltd., Espoo (FI)

( * ) Notice: Subject to any disclaimer, the term of this patent is extended or adjusted under 35 U.S.C. 154(b) by 191 days.

(21) Appl. No.: 09/641,286

(22) Filed: Aug. 17, 2000

(51) Int. Cl.[7] .................................................. G09G 5/00
(52) U.S. Cl. ........................ 345/168; 341/22; 200/5 A
(58) Field of Search ................................. 200/5 A, 308, 200/310–314; 345/43–46, 76–82, 168–172; 341/22, 23, 34

(56) References Cited

U.S. PATENT DOCUMENTS

| | | | | |
|---|---|---|---|---|
| 3,829,632 A | * | 8/1974 | Klehm | 200/302.2 |
| 4,022,993 A | | 5/1977 | Shattuck | 200/5 |
| 4,060,703 A | * | 11/1977 | Everett, Jr. | 200/275 |
| 4,447,692 A | | 5/1984 | Mierzwinski | 219/10.55 B |
| 4,532,395 A | * | 7/1985 | Zukowski | 200/314 |
| 4,551,717 A | | 11/1985 | Dreher | 340/712 |
| 5,736,973 A | | 4/1998 | Godfrey et al. | 345/102 |
| 5,871,088 A | * | 2/1999 | Tanabe | 200/314 |
| 5,898,276 A | * | 4/1999 | Tsuruoka et al. | 315/169.3 |

FOREIGN PATENT DOCUMENTS

| | | | |
|---|---|---|---|
| EP | 8137487 | 5/1996 | G10K/15/04 |
| EP | 0809420 | 11/1997 | H05B/33/00 |
| GB | 2343933 | 5/2000 | F02E/3/22 |
| JP | 11-260183 | * 9/1999 | H01H/13/02 |
| WO | 9918590 | 4/1999 | H01H/13/70 |
| WO | 0055879 | 9/2000 | |

* cited by examiner

*Primary Examiner*—Alexander Eisen
(74) *Attorney, Agent, or Firm*—Ware, Fressola, Van Der Sluys & Adolphson LLP

(57) ABSTRACT

An integrated key and a method of producing the integrated key, wherein the integrated key can be used on an electronic device. The integrated key includes an organic light-emitting layer and a plurality of electrodes, operatively connected to a power source, to activate the light-emitting layer in order to illuminate the key. Furthermore, the light-emitting layer and the electrodes can be arranged into a group of segments or pixels. The segments or pixels can be individually addressable so that they can be selectively activated to from a symbol or words. The key is implemented on a substrate and includes an encapsulation layer to form a cavity for filling with a gaseous species to protect the organic light-emitting layer in the key.

13 Claims, 10 Drawing Sheets

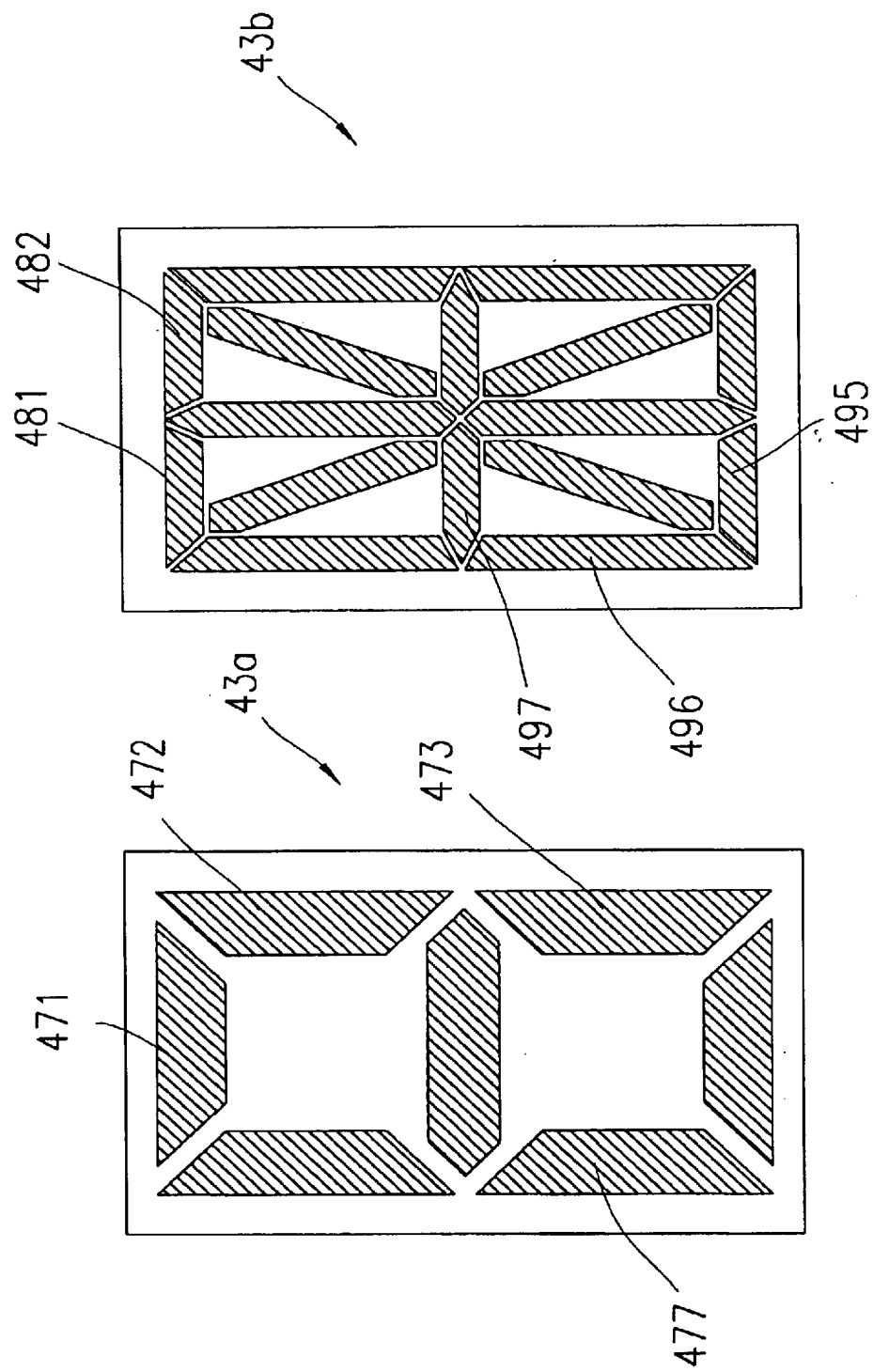

INTEGRATION OF ORGANIC LIGHT-EMITTING COMPONENTS INTO THE KEYBOARD OF AN ELECTRONIC DEVICE

CROSS-REFERENCE TO RELATED APPLICATION

Reference is made to application Ser. No. 09/641,199 entitled "ARRANGEMENT FOR INTEGRATION OF KEY ILLUMINATION INTO KEYMAT OF PORTABLE ELECTRONIC DEVICES" by Toni Östergård, Terho Kaikuranta, Bror Svarfvar, assigned to the assignee of this application and filed on even date herewith.

FIELD OF THE INVENTION

The present invention relates generally to a keypad or keyboard to be used on a portable electronic device and, more particularly, to a keypad to be used with the keypad or keyboard.

BACKGROUND OF THE INVENTION

In a portable electronic device, such as a mobile phone, a communicator, a personal data assistant (PDA), a portable communications device or the like, a keyboard is usually used to provide a User Interface (UI) between the user and the device. Typically, the keyboard includes a plurality of alphanumerical keypads and/or function keys to allow a user to select a function or to key a value into the device. When the ambient lighting is inadequate, it is essential that the keypads or keys are illuminated so that the user can correctly select the keys.

In a conventional illuminated keyboard, including a keypad and an underlying circuit board, discrete light-emitting devices (LEDs) are surface-mounted on the circuit board to provide illumination to the keypads thereabove. Alternatively, light guides or conduits are used to guide light from one or more light sources on the circuit board to the proximity of the keypads. Conventionally, all the LEDs mounted on the circuit board, as described above, are turned on or off at the same time. Thus, like the light guides, the LEDs for illuminating the keypads cannot be selectively controlled. Furthermore, the surface-mounted LEDs are bulky, and their power consumption is usually high. Because of their bulkiness and high power consumption, these surface-mounted LEDs are not optimal for use in a small portable electronic device.

On a mobile phone, a communicator and any other portable communications device, there is usually an information display panel, such as an LCD panel, for providing information to the user. Typically, one or more softkeys are used to guide the user to operate the device. A softkey has a function displayed at a designated area of the display panel and an associated keypad located outside the display panel adjacent to the designated area. A user can use the associated keypad to choose the function of the softkey. For example, two softkeys are often used in a Nokia mobile phone to assist a user to operate the mobile phone. When the mobile phone is turned on, the initial functions of these two softkeys are shown as "Menu" and "Name" at their corresponding designated areas. By choosing the "Menu" function through the associated keypad, the displayed functions of the two softkeys will change to "Select" and "Exit". The "Select" and "Exit" functions are "requests" to the user, asking the user to choose the next course of action regarding the use of the mobile phone. In this way, the user is provided with a guide to operate the device according to the displayed functions of the softkeys at a given moment. However, this type of softkey has several disadvantages as described below. Because the function of the softkey is shown at a designated area within the display panel, the use of softkeys significantly reduces the available area for displaying other messages on the display panel. Thus, for practical reasons, the number of softkeys is limited to only a few. Moreover, it has been found that some users are confused over the "requests" shown at the designated areas of the display panel and usually cannot relate the requests to the associated keypads. This psychological obstacle is a real problem for traditional softkeys.

It is advantageous and desirable to provide a key wherein the illuminating light source is small and has a low power consumption, and wherein illumination of keys can be selectively controlled. Furthermore, the illuminated key area can include alphabetical letters, numerals, text and/or graphical images to indicate the functions of the key so that the key can be used to replace the softkeys in certain portable electronic devices.

SUMMARY OF THE INVENTION

The first aspect of the present invention is an emissive key for use in a keypad or keyboard. The emissive key comprises:

a substrate;

a first electrode layer having a first side and an opposing second side, wherein the first side of the first electrode layer is provided on the substrate;

an organic light-emitting layer having a first side and an opposing second side, wherein the first side of the organic light-emitting layer is provided on the second side of the first electrode layer;

a second electrode layer having a first side and an opposing second side, wherein the first side of the second electrode layer is provided on the second side of the organic light-emitting layer; and a gas encapsulation layer provided on the second side of the second electrode defining a cavity between the encapsulation layer and the second side of the second electrode layer for containing at least one gaseous species for protecting the light-emitting layer, wherein the first and second electrode layers are operatively connected to a power source in order to activate the organic light-emitting layer.

Preferably, the gaseous species is nitrogen or argon or a combination thererof.

Preferably, the first electrode layer is transparent.

Preferably, the organic light-emitting layer comprises a single pixel to produce light when the organic light-emitting layer is activated, and the key further comprises a masking layer provided on the substrate having clear and opaque areas to form a pattern or symbol, allowing the light produced by the single pixel to pass therethrough.

Alternatively, the organic light-emitting layer comprises a plurality of light-emitting segments which are individually addressable, and the first and second electrode layers comprise a plurality of electrodes for selectively activating the light-emitting segments to form one or more alphabetical letters, symbols or numerals.

Alternatively, the organic light-emitting layer comprises a plurality of light-emitting segments which are individually addressable, and the key further comprises a masking layer provided on the substrate having clear and opaque areas to form a plurality of symbols, allowing the light produced by one or more light-emitting segments to pass through one or more of the symbols, wherein the symbols may include one or more alphabetical letters and numerals.

The second aspect of the present invention is a method of producing an emissive key for use in a keyboard of an electronic device. The method comprises the steps of:

providing a substrate;

providing a first electrode layer on the substrate;

providing an organic light-emitting layer on the first electrode layer;

providing a second electrode layer on the organic light-emitting layer;

providing a gas encapsulation layer on the second electrode defining a cavity between the encapsulation layer and the second electrode layer; and providing at least one gaseous species in the cavity to protect the light-emitting layer, wherein the first and second electrode layers are electrically connected to a power source in order to activate the organic light-emitting layer.

Preferably, the organic light-emitting layer comprises a plurality of light-emitting segments and the first and second electrode layers comprise a plurality of electrodes for selectively activating the light-emitting segments.

Preferably, the method further comprises the step of providing a masking layer on the substrate, wherein the masking layer has a clear area and an opaque area to form a pattern, so as to allow the light produced by the organic light-emitting layer to pass through the pattern when the organic light-emitting layer is activated.

The present invention will become apparent upon reading the description taken in conjunction with FIGS. 1a to 7.

BRIEF DESCRIPTION OF THE DRAWINGS

FIG. 3a is a diagrammatic representation illustrating the key effectively comprising a plurality of segments, which can be selectively activated to form a numeral.

FIG. 3b is a diagrammatic representation illustrating the key effectively comprising a plurality of segments, which can be selectively activated to form an alphanumerical symbol.

DETAILED DESCRIPTION

Figure 1A:
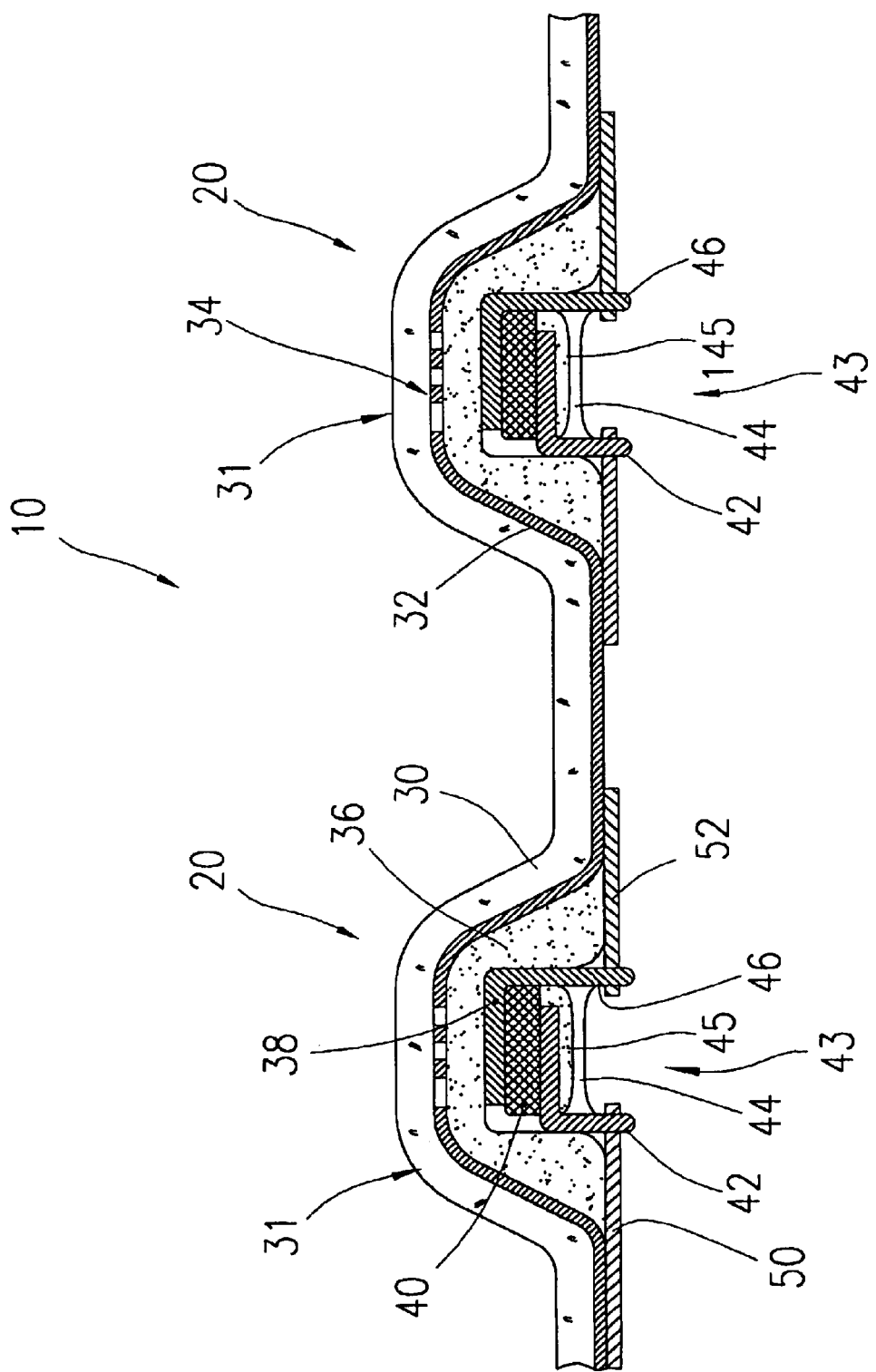
FIG. 1a is a diagrammatic representation showing the preferred embodiment of the emissive key, according to the present invention.
Figure 2A:
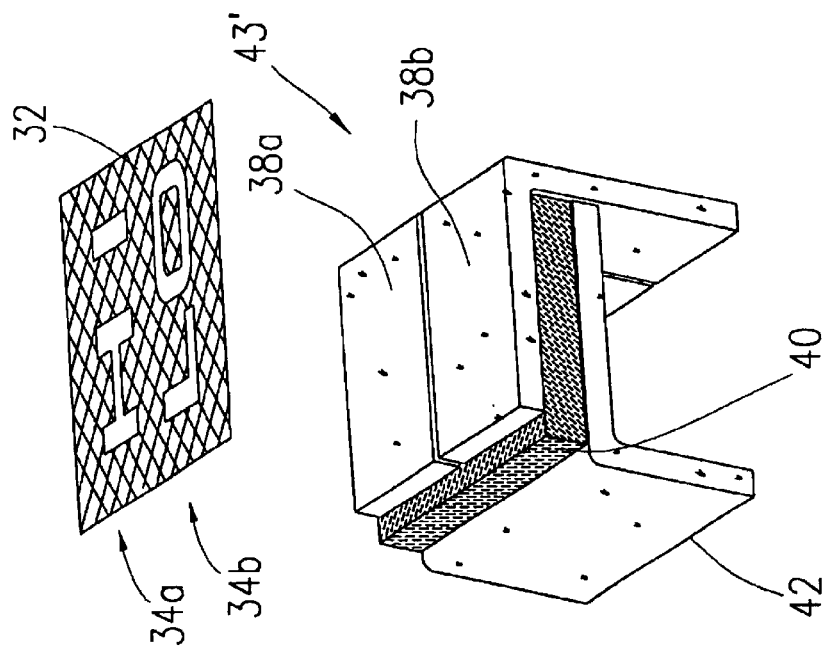
FIG. 2a is a diagrammatic representation illustrating the light-emitting layer being effectively a single pixel or segment.

FIG. 1a illustrates an integrated keypad 10 having a plurality of emissive keys 20 to be used on a portable electronic device. The keypad 10 includes a substrate 30, which can be formed from a plastic sheet or any other suitable material. Preferably, the substrate 30 is reasonably flexible to allow a user to push the keys 20 downward to select a function or enter a value into the electronic device. The top layer has a masking layer 32 to provide a legend or a marking 34 (see FIGS. 2a–2b) to each key 20. As shown, the top layer 30 has a plurality of recesses 31 for forming the keys 20. It is preferable that the keys 20 be partially filled with a transparent or translucent plastic filling 36, or any other suitable material such as glass, metal and ceramic, to add mechanical strength to the individual keys 20. To make the keys 20 emissive, a transparent top electrode layer 38, a light-emitting layer 40, and a bottom electrode layer 42 together form a light-emitting source 43 (see FIGS. 2a–2c) for each key 20. The top electrode layer 38 can be deposited directly on the filling 36, followed by the placement of the light-emitting layer 40 and the bottom electrode layer 42. Alternatively, one or more of the components, including the top electrode layer 38, the light-emitting layer 40 and the bottom electrode layer 42, can be introduced as a solid form into the recess 31. The light-emitting source 43 can be a single pixel, as shown in FIG. 2a, or a plurality of segments, as shown in FIGS. 2b, 2c, 3a and 3b. Preferably, the light-emitting layer 40 is made from one or more organic materials. The organic materials can be molecular, and they can be directly deposited into the inside of the key by vacuum evaporation or sublimation. The organic materials can also be polymeric, commonly known as light-emitting polymers (LEPs), and they can be printed within the recess 31 of the key 20 with an inkjet printer or a similar machine. Devices based on the organic light-emitting materials are also known as organic light-emitting devices (OLEDs), as opposed to regular LEDs, which are made of inorganic materials. Alternatively, the light-emitting layer can be made of screen-printed electroluminescence (EL) pixels, or other discrete light-emitting devices. It is preferred that the light-emitting layer 40 be hermetically sealed with an encapsulation material 44, with only the electrical connections to the light-emitting layer 40 being exposed to the outside of the encapsulation. If necessary, an extension electrode 46 is provided to electrically expose the top electrode 38 outside the encapsulation material 44 for electrical connections. Preferably, a gap 45 is provided between the encapsulation material 44 and the light-emitting layer 40 for filling therewith one or more protective gases, such as nitrogen ($N_2$) and argon (Ar). It should be noted that it is possible to fabricate the light-emitting source 43, which includes the electrodes 38, 42, 46 and the light-emitting layer 40, separately from the top layer 30 and secure this illuminating source to the recess 31. As shown in FIG. 1a, the keypad 10 further comprises electrical connectors 50, 52 for providing electrical power to the light-emitting source 43 for activating the light-emitting layer 40. It is preferred that the emissive keys 20 are individually addressable so that they can be selectively illuminated.

Figure 1B:
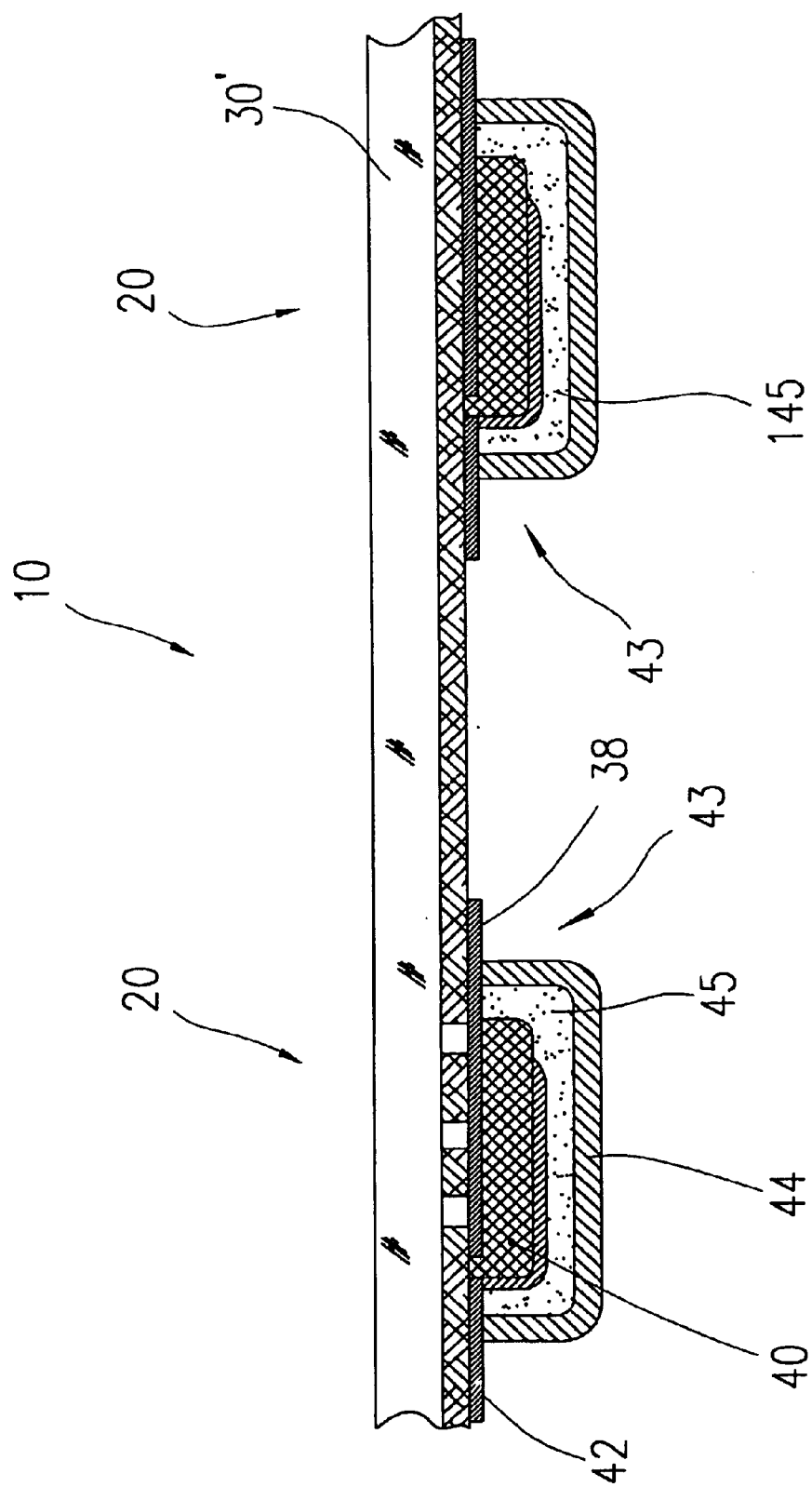
FIG. 1b is a diagrammatic representation showing another embodiment of the present invention.

FIG. 1b illustrates another embodiment of the present invention, wherein the substrate does not have recesses thereon. As shown, the substrate 30' is substantially flat. Thus, the light-emitting light source 43, which includes the top electrode layer 38, the organic light-emitting layer 40 and the bottom electrode layer 42, can be implemented directly on the substrate 30' without the need of the filling 36, followed by the implementation of the encapsulation layer 44.

Figure 2B:
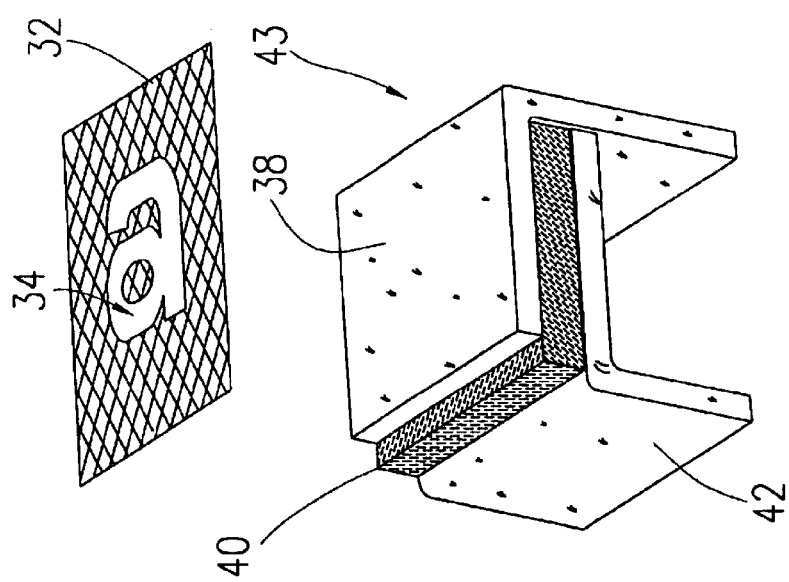
FIG. 2b is a diagrammatic representation illustrating the key effectively comprising two segments, which can be selectively activated.
Figure 2C:
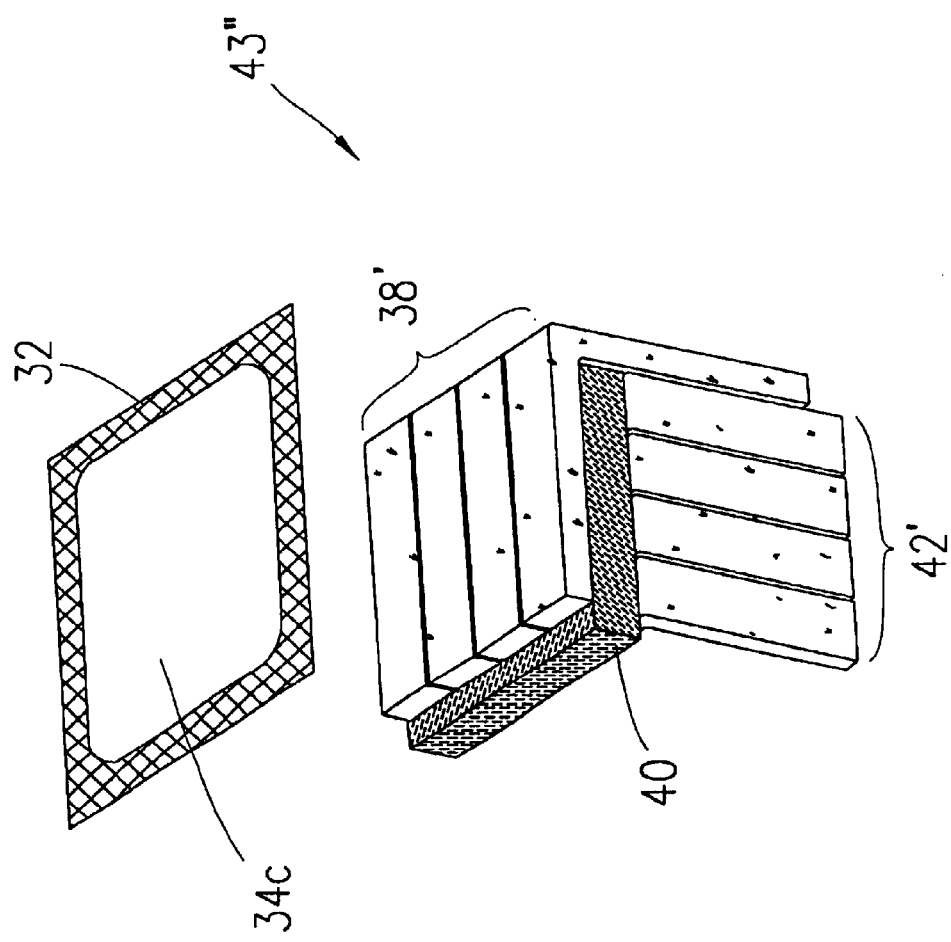
FIG. 2c is a diagrammatic representation illustrating the key effectively comprising a plurality of segments, which can be selectively activated, arranged into a matrix.

FIGS. 2a to 2c illustrate different configurations of the emissive keys. As shown in FIG. 2a, the light-emitting source 43 comprises basically a single light-emitting pixel for illuminating substantially the entire surface of a key 20 (see FIGS. 1a and 1b). In that case, it is preferable to have a masking layer 32, which includes clear and opaque areas to form a clear pattern for the text, legend or symbol that is used as the marking 34. As shown in FIG. 2a, the marking 34 is a letter "a".

As shown in FIG. 2b, the top transparent electrode layer 38 includes two top transparent electrodes 38a, 38b, and the light-emitting source 43' effectively comprises two light-emitting pixels or segments: one defined by the top transparent electrode layer 38a and one defined by electrode layer 38b. The top electrodes 38a, 38b are selectively controllable so that one or both pixels thereunder can be activated to illuminate one or more segments of the key surface. In that case, the marking 34 above the illuminating source can have one or more legends or symbols 34a, 34b. For example, when the bottom electrode 42 and the top electrode 38a supply electrical power to activate the light-emitting layer 40, the legend "HI" of the marking 34 is illuminated. Likewise, when the bottom electrode 42 and the top electrode 38b supply electrical power to activate the light-emitting layer 40, the legend "LO " of the marking 34 is illuminated.

It is possible for the light-emitting source 43" to be effectively produced as a matrix of pixels or segments, as shown in FIG. 2c. To illustrate the pixel matrix, FIG. 2c simplistically depicts a matrix of 4×4 pixels which can be selectively activated by a group of four top electrodes 38' and a group of four bottom electrodes 42'. The individual pixels in the light-emitting component 40 are addressable by a control circuit (not shown) through the electrodes 38' and 42'. In this case, it is possible to form a symbol or legend by selectively activating the pixels, and the masking layer 32 may simply have a window 34c to define the key surface area, as shown in FIG. 2c.

It is also possible for the light-emitting source to be produced as a segmented-type display. As shown in FIG. 3a, the light-emitting source 43a effectively comprises seven segments 471, 472, . . . , 477, which are individually addressable so that they can be selectively activated to form a numeral. Alternatively, the light-emitting source 43b can have sixteen segments 481, 482, . . . , 496, which are individually addressable so that they can be selectively activated to form an alphabetical letter, a numeral or a simple mathematical symbol, as shown in FIG. 3b.

The group of pixels as shown in FIGS. 2b and 2c, or the group of segments as shown in FIGS. 3a and 3b, can be addressed passively (passive-matrix addressing) or actively (active-matrix addressing).

Figure 6A:
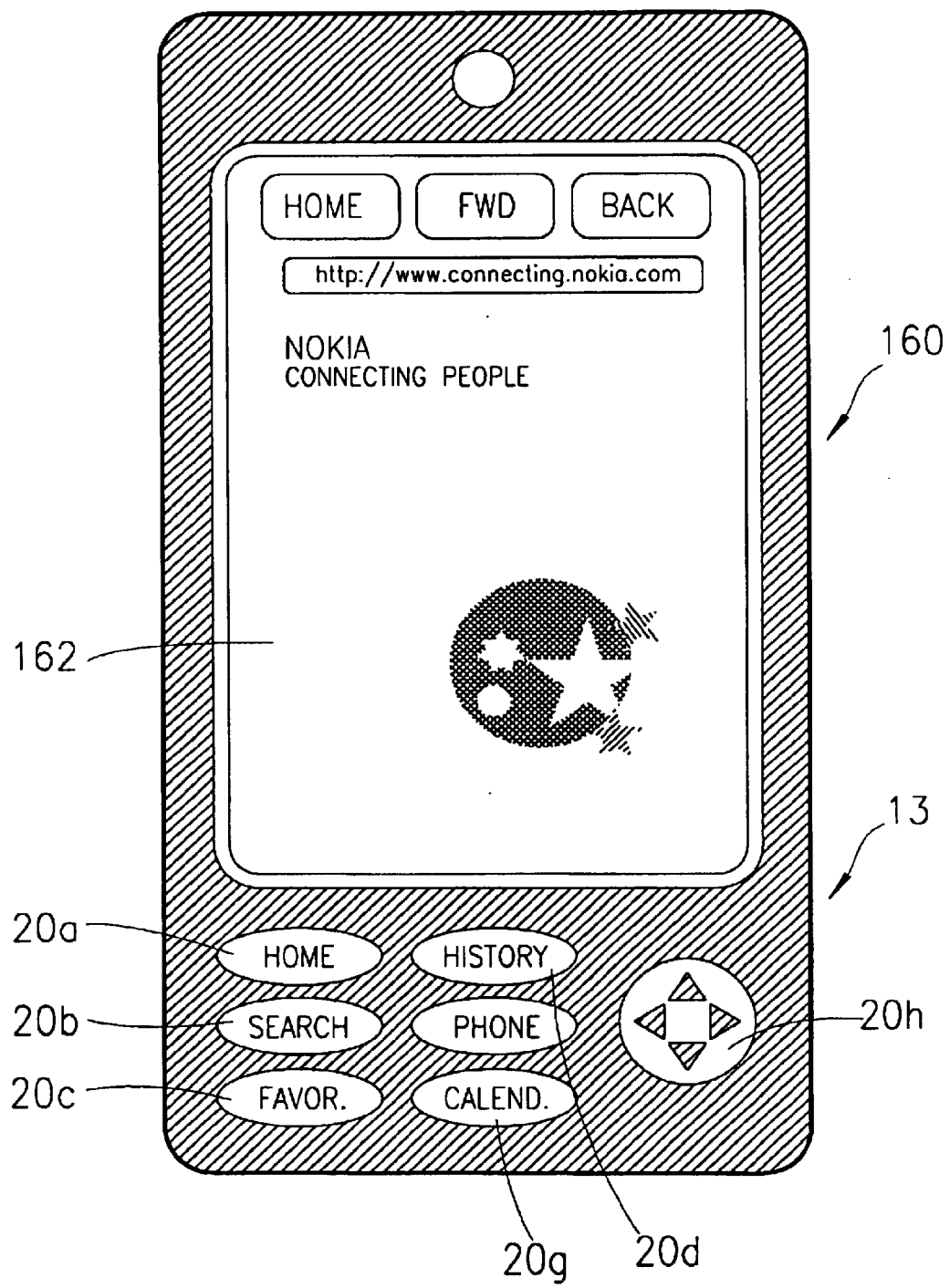
FIG. 6a is a diagrammatic representation illustrating the use of integrated keys to define some functions of a communications device.
Figure 6B:
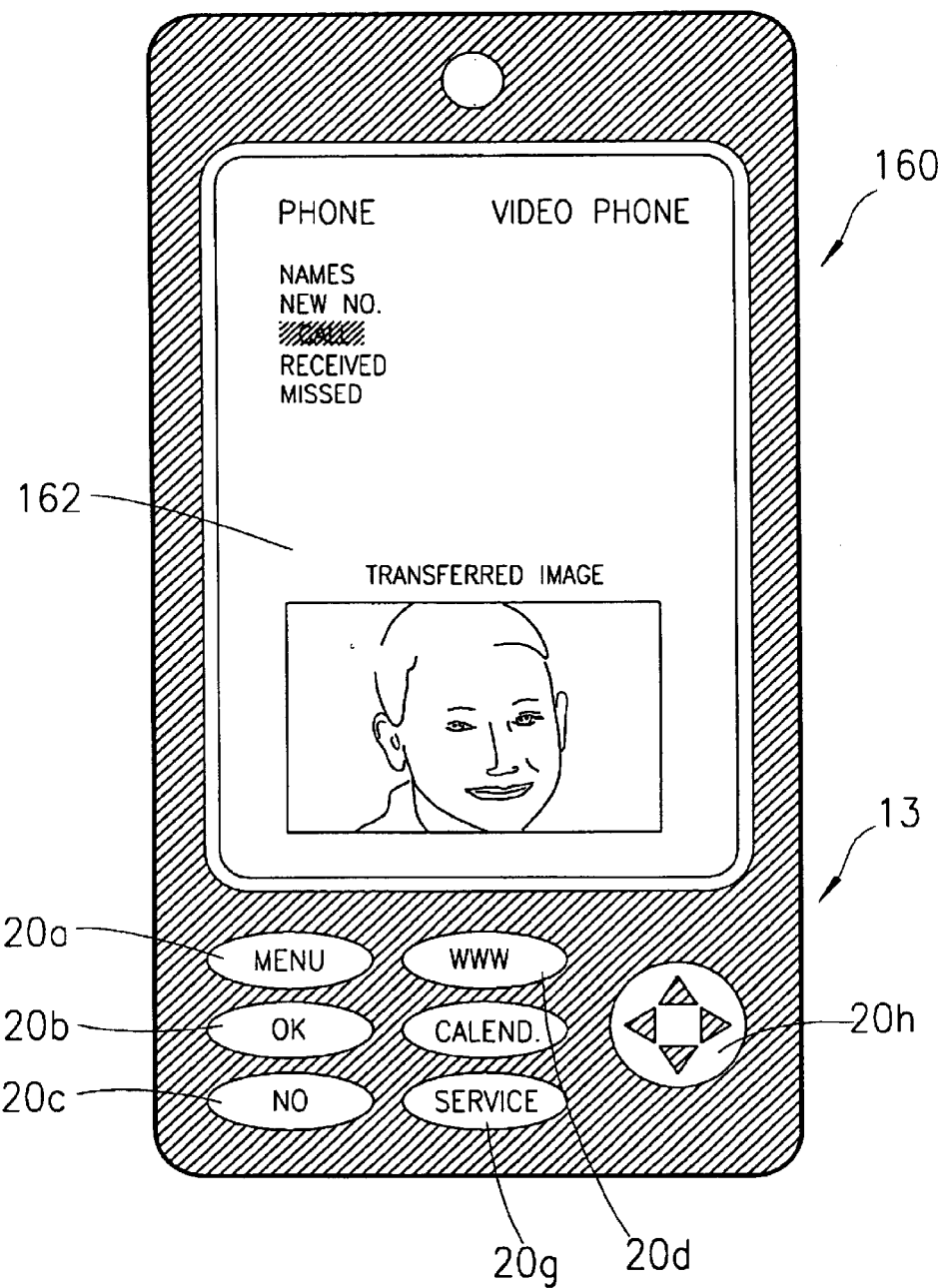
FIG. 6b is a diagrammatic representation illustrating the use of integrated keys to change the functions of the communications device.

With a sufficiently large number of pixels in each light-emitting source 43, the same key 20 can be programmed to show different texts or graphics, as shown in FIGS. 6a and 6b. These matrix- and segmented-types of light-emitting sources make it easy to change the operating modes of an electronic device from one to another without changing the keyboard. For example, the same electronic device can be used as a mobile phone, a PDA or a sophisticated calculator. Furthermore, the matrix or segmented light-emitting source allows the user to program each and every key of an electronic device to show the function for each key in a specific situation.

Figure 4:
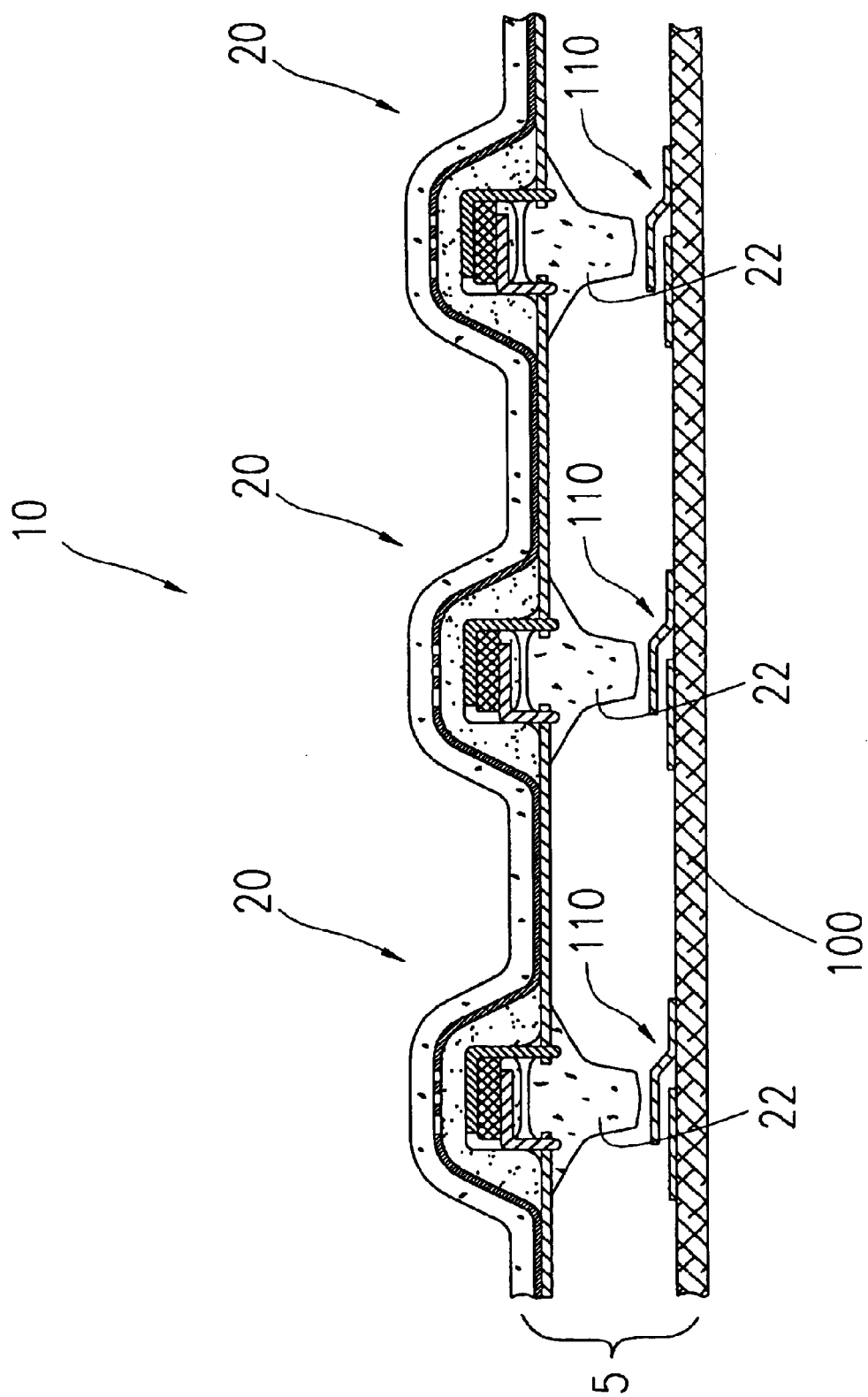
FIG. 4 is a diagrammatic representation illustrating the key, which includes a mechanical attachment for activating a contact switch in an electronic device.

FIG. 4 is a diagrammatic representation of a section of a keyboard 5, which includes an integrated keypad 10 implemented on top of a circuit board 100. Usually, each key 20 allows a user to select a function or key in a value through a switch 110 on the circuit board 100. As shown in FIG. 4, a plurality of switch activation pins 22 are provided to the keys 20 to allow a user to selectively activate the switches 110. The switches 110 shown in FIG. 4 are contact switches that have mechanical components on them. However, it is possible to use touch-sensitive switches instead. In that case, it is also possible to provide one or more capacitive/conductive elements (not shown) on or near the key 20 so as to allow the user to activate a switch, in a manner similar to a touch-screen. The mechanical and touch-sensitive switches are well known in the art.

Figure 5:
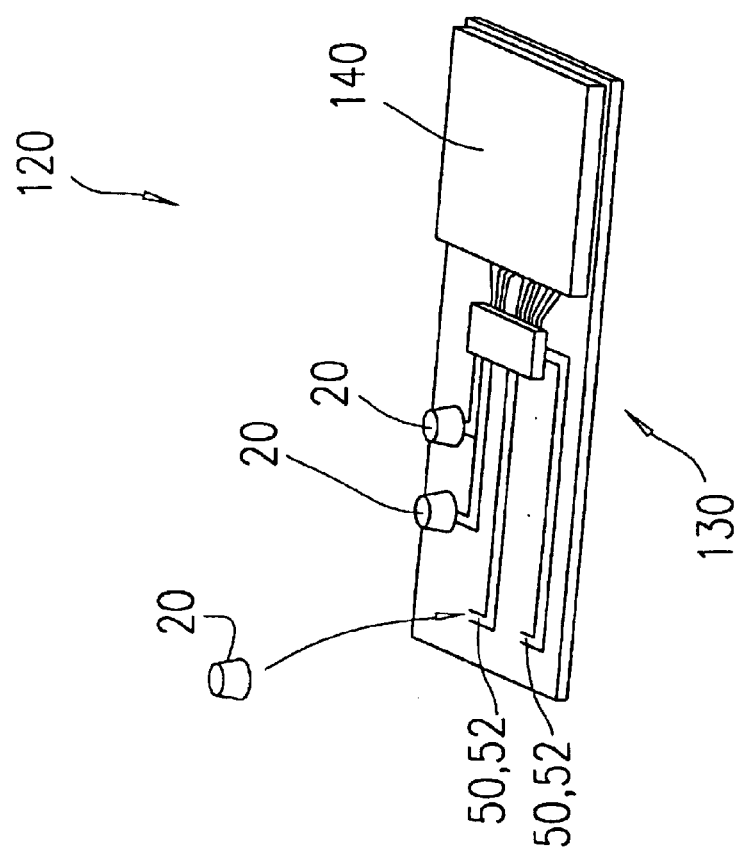
FIG. 5 is a diagrammatic representation illustrating the integration of keys onto a circuit board.

It is possible to integrate the individual emissive key 20, as shown in FIG. 1a, onto a flexible or rigid circuit board 120, as shown in FIG. 5. The essential components of the individual emissive key 20 include a section of the substrate 30, the top transparent electrode layer 38, the light-emitting layer 40, the bottom electrode layer 42 and the encapsulation layer 44 (see FIG. 1a). For providing electrical power to the light-emitting layer 40, it is preferred that the electrical connectors 50, 52 and the required circuitry 130 be provided on the circuit board 120. Furthermore, it is also possible that the circuit board 120 includes a display device, such as an LCD panel 140.

FIGS. 6a and 6b illustrate an integrated keypad 13 having a plurality of emissive keys 20 being used as part of a communications device 160. As shown in FIGS. 6a and 6b, the integrated keypad 13 includes a plurality of emissive keys 20a–20h. It is possible to use a plurality of pixels, as shown in FIG. 2c, or segments, as shown in FIGS. 3a and 3b, to form the legend of the emissive keys 20a–20h so that the legend can be changed to show different functions associated with the keys 20a–20h. For example, the communications device 160 can be operated in a "Browser" mode, as shown in FIG. 6a, or in a "Phone" mode, as shown in FIG. 6b. When the device is operated in the "Browser" mode, the display panel 162 can be used to display a web-page, for example. Accordingly, the legends on the emissive keys 20a–20h can be programmed to show a plurality of browser-related functions such as "HOME", "SEARCH", "FAVORITE", etc. But when the device is operated in the "Phone" mode, the display panel 162 can be used to display telephone-related information, and the legends on the emissive keys 20a–20h can be programmed to show a plurality of mobile phone-related functions such as "MENU", "OK", etc. Also, there is an emissive key 20d, which is programmed to show a "WWW" function, allowing the user to switch the device from the "PHONE" mode back to the "BROWSER" mode for fast access to the Internet.

Figure 7:
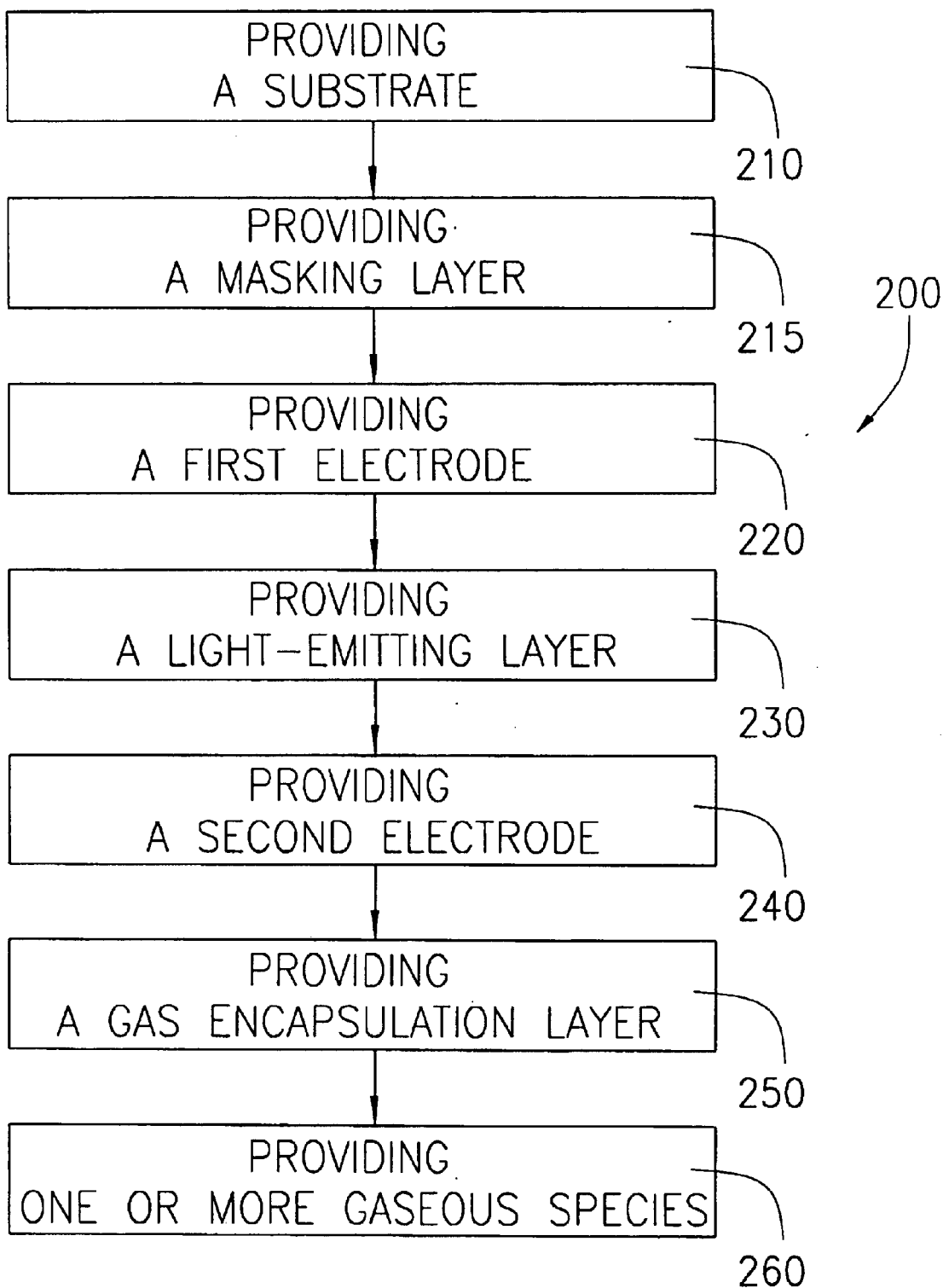
FIG. 7 is a flow chart illustrating the method of producing an emissive key, according to the present invention.

FIG. 7 illustrates a preferred method 200 for producing an emissive key 20. As shown in FIG. 7, a substrate is provided at step 210 and a first electrode is provided on the substrate at step 220. An organic light-emitting layer is provided on the first electrode at step 230. The organic light-emitting layer can be deposited onto the first electrode by vacuum evaporation or sublimation, but it can also be printed by an inkjet printer or a silk-screen printer. In order to activate the organic light-emitting layer, a second electrode on the organic light-emitting layer is provided at step 240. An gas encapsulation layer is provided on the second electrode at step 250, leaving a gap between the gas encapsulation layer and the second electrode layer so that one or more gaseous species can be introduced into the gap, at step 260, in order to protect the organic light-emitting layer. Preferably, a masking layer is provided to the emissive key, as denoted by step 215. The masking layer can be made on either side of the substrate.

Thus, the present invention has been disclosed according to a number of embodiments of the integrated key and the functions of the key. The light-emitting source in the key may comprise a single pixel, two or three pixels, or a large number of pixels organized into a matrix. The light-emitting source in the key may also comprise a plurality of segments, which can be selectively activated to form an alphabetical letter, a numeral or a symbol. The keys can be integrated into a substantially flat keyboard or a keyboard with recesses. That the keys can be selectively illuminated can help guide a user to operate an electronic device. By integrating the light-emissive components onto the keys, the illumination of the keypad becomes more power-efficient.

Although the invention has been described with respect to the preferred embodiments thereof, it will be understood by those skilled in the art that the foregoing and various other changes, omissions and deviations in the form and detail thereof may be made without departing from the spirit and scope of this invention.

What is claimed is:

1. An emissive key for use in a keyboard or keypad in an electronic device having a substrate, wherein the substrate has a first surface to face a user of the keyboard and an opposing second surface, and a plurality of electrical conductors disposed in a layer on the second surface of the substrate, and wherein the substrate comprises a plurality of recesses having filler layers in the recesses, said emissive key comprising:

a first electrode layer having a first side and an opposing second side, wherein the first side of the first electrode layer is provided on the second surface of the substrate in one of the recesses adjacent to the filler layer therein;

an organic light-emitting layer have a first side and an opposing second side, wherein the first side of the organic light-emitting layer is provided on the second side of the first electrode layer in said one of the recesses;

a second electrode layer having a first side and an opposing second side, wherein the first side of the second electrode layer is provided on the second side of the organic light-emitting layer; and a gas encapsulation layer provided adjacent to the second side of the second electrode defining a cavity between the encapsulation layer and the light emitting layer for containing at least one gaseous species in order to protect the light-emitting layer, wherein the first electrode layer and the second electrode layer are electrically connected to the electrical conductor for operatively connecting the first and second electrode layers to a power source in order to activate the organic light-emitting layer.

2. The emissive key of claim 1, wherein the gaseous species is nitrogen.

3. The emissive key of claim 1, wherein the gaseous species is argon.

4. The emissive key of claim 1, wherein the first electrode layer is transparent.

5. The emissive key of claim 1, wherein the organic light-emitting layer comprises a plurality of light-emitting segments and the first and second electrode layers comprise a plurality of electrodes for selectively activating the light-emitting segments.

6. The emissive key of claim 1, wherein the organic light-emitting layer produces light when it is activated, said emissive key further comprising a masking layer provided on the substrate, wherein the masking layer has a clear area and an opaque area to form a pattern, allowing the light produced by the organic light-emitting layer to pass through the pattern.

7. The emissive key of claim 6, wherein the pattern comprises an alphanumerical symbol.

8. The emissive key of claim 5, wherein the organic light-emitting segments produce light when they are activated, said emissive key further comprising a masking layer provided on the substrate, wherein the masking layer has a clear area and an opaque area to form a pattern, allowing the light produced by the organic light-emitting segments to pass through the pattern.

9. The emissive key of claim 8, wherein the pattern comprises a plurality of symbols and the organic light-emitting segments are selectively activated in order to produce light for passing through at least one of the symbols.

10. A method of producing an emissive key for use in a keyboard of an electronic device having a substrate, wherein the substrate has a first surface to face a user of the keyboard and an opposing second surface, and a plurality of electrical conductors disposed in a layer on the second surface of the substrate, and wherein the substrate comprises a plurality of recesses having filler layers in the recesses, said method comprising the steps of:

providing a first electrode layer on the second side of the substrate in one of the recesses adjacent to the filler layer therein;

providing an organic light-emitting layer on the first electrode layer in said one of the recesses;

providing a second electrode layer on the organic light-emitting layer;

providing a gas encapsulation layer adjacent to the second electrode layer defining a cavity between the encapsulation layer and the light emitting layer; and providing at least one gaseous species in the cavity in order to protect the organic light-emitting layer, wherein the first electrode layer and the second electrode layer are electrically connected to the electrical conductors for operatively connecting to a power source in order to activate the organic light-emitting layer.

11. The method of claim 10, further comprising the step of providing the first and second electrode layers connections to a power source in order to activate the organic light-emitting layer.

12. The method of claim 10, wherein the organic light-emitting layer comprises a plurality of light-emitting segments and the first and second electrode layers comprise a plurality of electrodes for selectively activating the light-emitting segments.

13. The method of claim 10, further comprising the step of providing a masking layer on the substrate, wherein the masking layer has a clear area and an opaque area to form a pattern, so as to allow light produced by the organic light-emitting layer, when activated, to pass through the pattern.

* * * * *

UNITED STATES PATENT AND TRADEMARK OFFICE
CERTIFICATE OF CORRECTION

PATENT NO. : 6,803,903 B1
DATED : October 12, 2004
INVENTOR(S) : Östergård et al.

It is certified that error appears in the above-identified patent and that said Letters Patent is hereby corrected as shown below:

Title page,
Item [74], Inventor, for "Terho Kaikuranta" city of residence "Piispranristi" should be -- Piispanristi --.

Signed and Sealed this

Twenty-eighth Day of December, 2004

JON W. DUDAS
*Director of the United States Patent and Trademark Office*